(12) United States Patent
Calienni

(10) Patent No.: US 7,122,597 B2
(45) Date of Patent: Oct. 17, 2006

(54) WALL PAPERING ADHESIVE

(75) Inventor: James J. Calienni, Bayonne, NJ (US)

(73) Assignee: Zinsser Co., Inc., Somerset, NJ (US)

( * ) Notice: Subject to any disclaimer, the term of this patent is extended or adjusted under 35 U.S.C. 154(b) by 130 days.

(21) Appl. No.: 10/459,192

(22) Filed: Jun. 11, 2003

(65) Prior Publication Data

US 2004/0011250 A1    Jan. 22, 2004

Related U.S. Application Data

(60) Provisional application No. 60/387,771, filed on Jun. 11, 2002.

(51) Int. Cl.
C08L 31/04 (2006.01)

(52) U.S. Cl. .......... 524/563; 524/35; 524/47; 524/379; 524/386; 524/388; 524/559

(58) Field of Classification Search .......... 524/35, 524/47, 379, 386, 388, 559, 563
See application file for complete search history.

(56) References Cited

U.S. PATENT DOCUMENTS

| | | | | |
|---|---|---|---|---|
| 2,424,546 | A * | 7/1947 | Bauer et al. | 428/350 |
| 3,549,566 | A * | 12/1970 | Mesirov | 524/26 |
| 4,477,622 | A * | 10/1984 | Sanderson et al. | 524/522 |
| 4,844,972 | A | 7/1989 | Tedeschi et al. | |
| 5,387,641 | A | 2/1995 | Yeung et al. | |
| 5,441,784 | A | 8/1995 | Smith | |
| 5,487,929 | A | 1/1996 | Rusincovitch, Jr. et al. | |
| 5,698,052 | A | 12/1997 | Russo et al. | |
| 5,716,717 | A * | 2/1998 | Yeung et al. | 428/511 |
| 5,811,485 | A | 9/1998 | Charnock et al. | |
| 5,932,639 | A | 8/1999 | Eden et al. | |
| 6,084,018 | A * | 7/2000 | Wildburg et al. | 524/424 |
| 6,194,064 | B1 | 2/2001 | Keely et al. | |
| 6,214,467 | B1 * | 4/2001 | Edwards et al. | 428/407 |
| 6,337,104 | B1 | 1/2002 | Draxo et al. | |
| 6,630,533 | B1 * | 10/2003 | Konopka et al. | 524/560 |

OTHER PUBLICATIONS

Hawley's Condensed Chemical Dictionary, Van Nostrand Reinhold Co., 1993. pp. 187-188, 566-567, 970-971.*

* cited by examiner

*Primary Examiner*—Helen L. Pezzuto
(74) *Attorney, Agent, or Firm*—Calfee, Halter & Griswold LLP

(57) ABSTRACT

Compositions for securing pre-pasted and non-pre-pasted wall coverings to a surface that is to be decorated are provided. The present compositions are aqueous colloidal dispersions or polymeric solutions comprising from about 3% to about 30% solids. The present compositions comprise water, an alkali, from about 2.5% to about 25% by weight of an alkali-soluble, polyvinyl acetate-crotonic acid copolymer, a thickener, and a glycol.

15 Claims, No Drawings

WALL PAPERING ADHESIVE

CROSS REFERENCE TO RELATED APPLICATIONS

This application claims the benefit of U.S. Provisional Patent Application No. 60/387,771 filed Jun. 11, 2002, which is incorporated herein by reference.

FIELD OF THE INVENTION

The present invention relates to water removable compositions for securing a wall covering to a substrate, particularly a wall. In one aspect, the composition is particularly well-suited for securing a pre-pasted wall covering to the substrate. In another aspect, the composition is particularly well-suited for securing a heavy gauge wall covering that is not pre-pasted to a substrate.

BACKGROUND OF THE INVENTION

Wall coverings are used by homeowners to decorate walls, cabinets, furniture and other articles found in the home. The surfaces to which the wall covering is affixed include, but are not limited to, painted or unpainted wood, painted or unpainted fiberboard, veneer paneling, melamine laminate, cementitious walls, vinyl treated and untreated gypsum board.

Typically, wall coverings comprise one or two layers. The first layer is the decorative layer. Materials which are used for the first layer include, but are not limited to, paper, mylar, foil, vinyl and fabric. The second layer is referred to as the backing or backside. Materials that are used for the backing include paper and fabric. Certain wall coverings, referred to as "pre-pasted" wall coverings, have a dry pre-paste adhesive present on the backside of the wall covering. Other wall coverings, referred to hereinafter as "non-pre-pasted" wall coverings, do not have an adhesive on the backside.

Oftentimes, a pre-paste activator is applied to the backside of a pre-pasted wall covering, either by brush or roller, before it is hung on a wall or affixed to another substrate. Typically, such pre-paste activators are aqueous alkaline solutions comprising from about 3% to 5% starch, cellulose or another polysaccharide. The wall covering is then booked (allowed to sit folded adhesive side to adhesive side), during which time the pre-paste adhesive swells and the paper relaxes. As it relaxes, the paper loses its rolled up configuration and becomes flat, making it easier to handle. If the substrate surface is too slick, the pre-paste adhesive/pre-paste activator combination may not be sufficient to provide proper adhesion, thereby resulting in edge curling of the wall covering or formation of bubbles between the wall covering and the substrate surface. Indeed, the wall covering may not even stick to the substrate surface and self lift. Under such circumstances, additional adhesive power is required. Additional adhesive power can be obtained by applying another adhesive product such as a polyvinyl acetate (PVA), latex-based adhesive or a higher solids polysaccharide based adhesive to the wall covering. Alternatively, a liquid primer is applied to the surface of the substrate. Use of these additional products results in additional burdens on the person hanging the wall covering, and increased costs to the consumer.

In certain instances, the wall covering may be in the form of a pre-pasted or non-pre-pasted border which is attached to a painted surface or an underlying vinyl wall covering. To ensure good adherence and to avoid edge curling of the border, it is oftentimes necessary to secure the border to the underlying surface with a latex paste comprising polyvinyl acetate. When pressure is applied to the border, the paste-like latex squeezes out onto the underlying surface. If allowed to dry, the latex paste forms a glossy film on the underlying surface. If the film is not removed immediately from a painted surface, it will harden and become difficult to remove without marring the paint. The damage caused to the painted surface diminishes the aesthetic quality of the completed decorating project.

Accordingly, there is a need for additional compositions that can be used to secure a wall covering to an underlying surface. Water-removable compositions that can serve as activators and improve the adherence of pre-pasted wall coverings to an underlying surface are desirable. Water-removable compositions that can be used as adhesives for securing non-pre-pasted wall coverings, particularly heavy gauge, non-pre-pasted, fabric-backed or woven wall coverings referred to as commercial type II or III, to an underlying surface are also desirable.

SUMMARY OF THE INVENTION

The present invention provides compositions for securing pre-pasted and non-pre-pasted wall coverings to a surface that is to be decorated. The present compositions are aqueous colloidal dispersions or polymeric solutions comprising from about 3% to about 30% solids. The present compositions comprise water, an alkali, from about 2.5% to about 25% by weight of an alkali-soluble, polyvinyl acetate-crotonic acid copolymer, a thickener, and a glycol.

In one preferred embodiment, the composition serves as a water-removable, pre-paste activator which is especially useful for improving the adherence of pre-pasted wall coverings, particularly pre-pasted vinyl wall coverings, to an underlying surface. When used as a pre-paste activator, the composition preferably comprises from about 2.5% to about 6% by weight of a polyvinyl acetate-crotonic acid copolymer, from about 6% to about 9% solids, and from about 94% to about 91% non-solids. The pre-paste activator has a pH of from 8 to 11 and a viscosity of from 70 to 95 Kreb units (KU) or 5000 to 15000 centipoise.

In another preferred embodiment, the composition serves as a water-removable adhesive for securing heavy-gauge, non-pre-pasted wall coverings to an underlying surface. When used as an adhesive for heavy gauge non-pre-pasted wall coverings, the composition preferably comprises from about 15% to about 25% by weight of the polyvinyl acetate-crotonic acid copolymer, from about 18% to 30% solids, and from about 82% to about 70% non-solids. The heavy-gauge wall covering adhesive, preferably, has a thick, paste-like viscosity of from 95 to over 140 Kreb units (KU) or over 100,000 centipoise.

Advantageously, the present compositions have good adhesion properties and, thus, are suitable for use on all wall coverings, including untreated and pre-pasted wall papers and vinyl wall coverings. Moreover, the present compositions are easily removed with water, and thus are particularly useful for affixing wall papers and vinyl wall coverings to all surfaces, including painted surfaces.

The present invention also relates to method of making the present compositions and methods of using the present composition to secure a wall covering to a surface.

DETAILED DESCRIPTION OF THE INVENTION

In accordance with the present invention, a water-removable composition for affixing wall coverings to a surface is provided. The composition is an aqueous colloidal dispersion or polymeric solution comprising water, an alkali, from about 2.5% to about 25% by weight of an alkali-soluble, polyvinyl acetate-crotonic acid copolymer, a thickener, and a glycol. Adhesive strength of the composition depends, at least in part, on the amount of the copolymer present in the composition. Accordingly, compositions comprising 25% by weight of the polyvinyl acetate-crotonic acid copolymer have greater adhesive strength than compositions comprising 2.5% by weight of the copolymer. The present composition is an aqueous colloidal dispersion or polymeric solution, having a pH of 8 to 11 and comprising from about 3% to about 30% solids.

Examples of suitable solvents for use in the composition are tap water, de-ionized water, distilled water, a water-alcohol mixture which comprises water and a lower alcohol, i.e., an alcohol comprising from 1 to 3 carbon atoms, including methanol, ethanol, propanol, iso-propyl alcohol, or a mixture of water and ethyl acetate. Examples of suitable glycols are glycols whose backbone comprise fewer than 4 carbon atoms, such as ethylene glycol, glycerine, and propylene glycol.

The present composition comprises from about 2.5 to 25% by weight of a poly vinyl acetate-crotonic acid copolymer. The preferred physical criteria ranges for the PVA-crotonic acid copolymer are as follows: acid number of about 35–45 mg KOH/g, a softening point of 80–145 degrees centigrade with a molecular weight of 35,000 to 100,000 g/mole. Such copolymers are commercially available Preferably, the compositions comprises from about 0.5 to about 2% by weight of a cellulosic or acrylic thickener. Examples of suitable thickeners are hydroxyethylcellulose (HEC), Hydrophobically Modified Alkali Swellable Emulsions (HASE). Vinyl Acetate based tackifiers may also be used as thickeners.

The present composition comprises an alkali which is used to dissolve the copolymer during preparation of the composition and to maintain the pH of the final composition at a value of 8 to 11. Examples of suitable alkali include, but are not limited to, organic bases, amino alcohols, ammonia and lower amines. As used herein the term "lower" amine refers to a water soluble low molecular weight amines. The term lower amine does not encompass aromatic amines. One example of a suitable alkali is 2-amino-2-methyl-1-propanol (AMP 95). Examples of other suitable alkali are: monoethanolamine, N,N, dimethylethanolamine, N,N,N-triethanolamine, or N'N'-diethylamine. Other alkalis that are suitable, but less preferred, include inorganic bases such as potassium hydroxide (KOH), sodium hydroxide, and sodium carbonate.

Preferably, the composition comprises sodium nitrite for preventing corrosion on metal surfaces. Optionally, the composition comprises a surfactant, such as sodium lauryl sulfate, to aid in wetting of the backside of the wall covering.

The present compositions may also comprise one or more components selected from a varying amount of mildewcide to inhibit fungal growth in the dry paste after wallcovering installation, an in-can preservative to protect the packaged product from microbial spoilage, and an opacifier to detect the product on undesired areas. Such mildewcides are commercially available and may be one of many known in the art including, 3-iodo-2-propynylbutylcarbomate(IPBC). Particularly suitable opacifiers are styrene-acrylic spheres. Further appropriate ingredients may be present as desired.

The ingredients in the composition generally are combined in the aqueous solvent in the following proportions using procedures known in the art:
from about 2.5% to about 25% by weight of the polyvinyl acetate-crotonic acid copolymer,
from about 0.5% to about 4.0% alkali,
from about 0.5% to about 2% by weight of a thickener,
from about 0.05 to about 0.1% by weight of sodium nitrite, and
from about 2.0 to about 10% by weight of a glycol.

Depending upon the adhesive strength desired, an appropriate amount of water dissolvable, polyvinyl acetate-crotonic acid polymer is neutralized with 2-amino-2-methyl-1-propanol (AMP 95) in water heated to about 40° C., and mixed for about 2 hours. The remaining ingredients are subsequently added in no particular order. The resulting paste has a pH of from 8 to 11 and a viscosity of from 5000 to over 100,000 centipoise or from 70 to over 140 KU(Kreb Units).

Depending upon the amount of copolymer in the composition, the present compositions can be used to affix prepasted or non-pre-pasted wall coverings to walls, ceilings, cabinets, and so forth. The compositions can be suitably applied to the wall covering using known procedures. The present compositions may be applied by brush, roller or squeeze tube. A most suitable procedure employs roller coating. In commercial applications, the present compositions are applied by a paste machine to save time and to assure even deposition of the adhesive to the wall covering.

Advantageously, the present compositions are water removable. Thus, any misapplied adhesive can be easily removed from the wall covering or any adjacent surfaces with water during application of the wall covering or after the composition dries and forms a film on the underlying or adjacent surfaces.

EXAMPLES

The invention may be better understood by reference to the following examples which serve to illustrate but not to limit the present invention.

Example 1

Pre-Paste Activator I

A pre-paste activator was prepared by mixing 71.0 parts (or weight %) water, 6.0 parts PVA-Crotonic Acid copolymer, 0.5 parts organic base, 0.3 parts defoamer and 1.40 parts cellulose thickener at a temperature of at least 48.8° C. and under high agitation until the resin was dissolved. The remaining ingredients and water shown in Table 1 were added in no particular order. The resulting product was a paste-like (6,000 to 7,000 centipoise), opaque material with a pH of 8.0–9.5.

TABLE 1

| Raw Material Component | Activator I (wt %) |
| --- | --- |
| Organic base | 0.5 |
| Water | 83.0 |
| Mineral oil based defoamer | 0.5 |
| Alkali soluble PVA Crotonic acid copolymer Molecular Weight 36,000 g/Mole | 6.0 |
| Mildewcide | 0.12 |
| Opacifier | 0.3 |
| Flash rust inhibitor | 0.1 |
| In can bacteriocide | 0.08 |
| Cellulosic thickener | 1.4 |
| Propylene glycol | 8.0 |
| TOTAL | 100.00 |

The ability of pre-paste activator I to enhance adhesion of a viny coated, pre-pasted wall covering to a variety of substrates was gauged by assessing the amount of effort required to remove the wall covering from the substrate after drying. Best adhesion, scored as 10, occurs when an attempt to remove the wall covering from the substrate results in tearing of the wall covering. Worst adhesion, scored as 0, occurs when no effort is required to separate the wall covering from the substrate, i.e., the wall covering lifts away from the vertical substrate due to its own. The results are shown in Table 3.

TABLE 3

Adhesion tests. Adhesion gauged by effort required to remove wall covering from the substrate after drying. Paper Tears is best adhesion (10) to Worst (0) total lifting from its own stress

| Degree of difficulty** | Substrates | Exhibit 1 formula | Commercial Activator*** | Commercial Adhesive**** |
| --- | --- | --- | --- | --- |
| 1 | Melamine Panel | 9 | 0 | 9 |
| 2 | Hard glossy alkyd Paint | 10 | 4 | 10 |
| 3 | Wall paper | 10 | 5 | 10 |
| 4 | High Quality Flat Paint | 10 | 10 | 10 |

**Degree of Difficulty rated as most difficult to adhere (1) with Conventional Pre-pasted wall covering.
***Commercial Formula comprised of 3% starch/cellulose dispersed in water
****Commercial Border Adhesive Formula comprised of about 25% Vinyl Acetate/Acrylic copolymer latex.

The water removal capability of the pre-paste activator from a variety of substrates gauged by evaluating the effort required to remove paste from the substrate with soap water after drying. Best water removable capability is scored as 10, while worst water removable capability is scored as 0. The results are shown below in Table 4.

TABLE 4

Cleanability. Gauged by effort required to remove compositione from the substrate with soap and water after drying. Scale is from (0–10), (10) is with least amount of effort.

| Degree of difficulty** | Substrates | Exhibit 1 formula | Commercial Activator*** | Commercial Adhesive**** |
| --- | --- | --- | --- | --- |
| 3 | Hard glossy alkyd Paint | 10 | 10 | 8 |
| 2 | Wall paper | 10 | 10 | 8 |
| 1 | High Quality Flat Paint | 10 | 10 | 2 |

**Degree of Difficulty rated as (1) most difficult to remove from those substrates listed
***Commercial Formula comprised of 3% starch/cellulose dispersed in water
****Commercial Border Adhesive Formula comprised of about 25% Vinyl Acetate/Acrylic copolymer latex.

Example 2

Adhesive I

A water-removable adhesive useful for attaching a non-pre-pasted wall covering to a substrate was prepared by combining the components shown in Table 2 according to the method described in Example 1.

TABLE 2

| Raw Material Component | Adhesive I (wt %) |
| --- | --- |
| Organic base | 4.5 |
| Water | 62.3 |
| Mineral oil based defoamer | 0.20 |
| Alkali soluble PVA Crotonic acid copolymer Molecular Weight 36,000 g/Mole | 25.00 |
| Mildewcide | 0.12 |
| Opacifier | 0.30 |
| Flash rust inhibitor | 0.1 |
| In can bacteriocide | 0.08 |
| Cellulosic thickener | 1.4 |
| Propylene glycol | 6.00 |
| TOTAL | 100.00 |

Example 3

Pre-paste activator II

A water-removable composition useful for attaching a pre-pasted wall covering to a substrate was prepared by combining the components shown in Table 5 according the method described in Example 1.

TABLE 5

| Raw Material Component | Activator II (wt %) |
| --- | --- |
| Organic base | 0.6 |
| Water | 83.9 |
| Mineral oil based defoamer | 0.5 |
| Alkali soluble PVA Crotonic acid copolymer Molecular Weight 95,000 g/Mole | 5.0 |
| Mildewcide | 0.12 |
| Opacifier | 0.3 |
| Flash rust inhibitor | 0.1 |
| In can bacteriocide | 0.08 |
| Cellulosic thickener | 1.4 |

TABLE 5-continued

| Raw Material Component | Activator II (wt %) |
|---|---|
| Propylene glycol | 8.0 |
| TOTAL | 100.00 |

Example 4

Adhesive II

A water-removable adhesive useful for attaching a non-pre-pasted wall covering to a substrate was prepared by combining the components shown in Table 6 according to the method described in Example 1.

TABLE 6

| Raw Material Component | Adhesive II (wt %) |
|---|---|
| Organic base | 4.0 |
| Water | 69.8 |
| Mineral oil based defoamer | 0.20 |
| Alkali soluble PVA Crotonic acid copolymer Molecular Weight 95,000 g/Mole | 18.00 |
| Mildewcide | 0.12 |
| Opacifier | 0.30 |
| Flash rust inhibitor | 0.1 |
| In can bacteriocide | 0.08 |
| Cellulosic thickener | 1.4 |
| Propylene glycol | 6.00 |
| TOTAL | 100.00 |

What is claimed is:

1. A water-removable composition for activating a pre-paste adhesive or affixing a wall covering to a surface, comprising: water, an alkali, an alkali-soluble polyvinyl acetate-crotonic acid copolymer, a thickener, and a glycol, wherein said composition is an aqueous colloidal dispersion or polymeric solution comprising from about 2.5 to about 25% by weight of said copolymer, from about 3% to about 30% by weight of solids, and from about 97% to about 70% by weight non-solids,
   wherein the composition has a pH of from 8–11, and
   wherein the composition, after application as a film to and drying on the surface of a substrate, is removable by washing with water.

2. The composition of claim 1 wherein said composition comprises from about 2.5% to about 6% by weightof the polyvinyl acetate-crotonic acid copolymer, from about 6% to about 9% by weight solids, and from about 94% to about 91% by weight non-solids.

3. The composition of claim 1 wherein said composition comprises from about 15% to about 25% by weight of the polyvinyl acetate-crotonic acid copolymer, from about 18% to 30% by weight solids, and from about 82% to about 70% by weight non-solids.

4. The composition of claim 1 wherein the alkali is selected from the group consisting of an amino alcohol and a lower amine.

5. The composition of claim 1 wherein the thickener is an alkali swellable emulsion.

6. The composition of claim 1 wherein the thickener is a polysaccharide.

7. The composition of claim 6 wherein the polysaccharide is cellulose, starch, guar, or modified guar.

8. The composition of claim 1 wherein the copolymer has an acid number of about 35 to 45, a melt point of about 80–145° C., and molecular weight (Mw) of about 35,000 to 100,000 g/mole.

9. The composition of claim 1 wherein the glycol has a backbone which comprises fewer than 4 carbon atoms.

10. The composition of claim 1 wherein said composition comprises an alcohol comprising from 1 to 3 carbon atoms, or ethyl acetate, or both.

11. The composition of claim 1, wherein said composition comprises a surfactant.

12. The composition of claim 1 wherein the alkali is an inorganic base.

13. The composition of claim 1 wherein the alkalai is an organic base.

14. A water removable composition for activating a pre-paste adhesive, the composition consisting essentially of:
   water, an alkali, an alkali-soluble polyvinyl acetate-crotonic acid copolymer, a thickener, and a glycol, wherein said composition is an aqueous polymeric solution comprising from about 2.5% to about 6% by molecular weight of the polyvinyl acetate-crotonic acid copolymer, from about 6% to about 9% by molecular weight solids, and from about 94% to about 91% by molecular weight non-solids,
   wherein the composition has a pH of from 8–11,
   wherein the composition, after application to and drying on the surface of a substrate, is removable by washing with water.

15. A water-removable composition for affixing a heavy-gauge, non-pre-pasted wall covering to an underlying surface consisting essentially of:
   water, an alkali, an alkali-soluble polyvinyl acetate-crotonic acid copolymer, a thickener, and a glycol, wherein said composition is an aqueous colloidal dispersion or polymeric solution comprising from about 15% to about 25% by weight of the polyvinyl acetate-crotonic acid copolymer, from about 18% to 30% by weight solids, and from about 82% to about 70% non-solids,
   wherein the composition has a viscosity over 100,000 centipoise,
   wherein the composition, after application to and drying on the surface of a substrate, is removable by washing with water, and
   wherein the composition has sufficient adhesive strength to affix the heavy gauge non-prepasted wall covering to a wall, or ceiling.

* * * * *